(12) United States Patent
Gutfleisch (10) Patent No.: US 7,856,623 B2
(45) Date of Patent: Dec. 21, 2010

(54) METHOD AND SYSTEM FOR PROVIDING AN ENUMERATION ASSISTANT

(75) Inventor: Michael Gutfleisch, Wiesloch (DE)

(73) Assignee: SAP AG, Walldorf (DE)

( * ) Notice: Subject to any disclaimer, the term of this patent is extended or adjusted under 35 U.S.C. 154(b) by 1230 days.

(21) Appl. No.: 11/418,673

(22) Filed: May 5, 2006

(65) Prior Publication Data

US 2007/0271295 A1     Nov. 22, 2007

(51) Int. Cl.
*G06F 9/45* (2006.01)
(52) U.S. Cl. .................................................. 717/138
(58) Field of Classification Search .................. 717/138
See application file for complete search history.

(56) References Cited

U.S. PATENT DOCUMENTS

2002/0022929 A1* 2/2002 Ell .................................. 702/5
2003/0200533 A1* 10/2003 Roberts et al. ............... 717/124
2003/0225462 A1* 12/2003 Bachman et al. ............... 700/1
2004/0139060 A1*  7/2004 Maxwell, III .................. 707/3

* cited by examiner

*Primary Examiner*—John Chavis
(74) *Attorney, Agent, or Firm*—Kenyon & Kenyon LLP (57) ABSTRACT

A method and system are provided for creating an enumerated variable via an enumeration assistant interactive tool. A graphical user interface is provided to a programmer. Response to a request to create the enumerated variable received through a graphical user interface, the enumeration assistant determines parameters of the enumerated variable. The enumeration assistant creates development objects for the enumerated variable as a function of the parameters. The enumeration assistant stores the development objects in a program memory.

20 Claims, 7 Drawing Sheets

METHOD AND SYSTEM FOR PROVIDING AN ENUMERATION ASSISTANT

BACKGROUND

Enumeration variable types are useful in programming languages where a programmer wishes to specify potential values of a variable and possibly define special methods that operate on the variables. Previous methods of creating, modifying and deleting enumeration variable types create potential for programmer error.

A type system in a programming language specifies what type of variables may exist in the programming language. Example types include integer numbers, floating point numbers and characters. Example data structures include objects in objected-oriented programming languages, arrays and lists.

An 'enumerated variable type' is a type of variable used in programming languages for which a finite set of legal values are defined in advance. During programming, a list of the possible values is defines defined by a programmer. For example, an enumerated variable type, called "Days" may be defined, which may have any one of the following legal values: Monday, Tuesday, Wednesday, Thursday, Friday, Saturday, and Sunday. As another example, an enumerated variable type "Traffic_Light" may take possible values of Green, Yellow, and Red.

An enumerated variable is used in programming to allow the programmer to improve type safety of the resulting code and improve code readability. Type safety prevents the programmer from accidentally or deliberately assigning a value of an incorrect type to a variable. A prior solution to create enumerated types was to have integer variables and assign integer values as possible values. This solution provided neither type safety nor improved code readability. Another prior solution was to have integer variables and assign integer constants as possible values. This solution improved code readability but did not provide type safety.

Previously, creating an enumerated variable was a tedious process involving multiple steps in many programming languages. In one programming language, a new domain is created with fixed value type codes. A new data element is created referring to this domain. Finally, a type pool is created with symbolic names that are defined with constant values. This creates redundant data scattered throughout a source code of an application.

DETAILED DESCRIPTION

A system and method is provided for an enumeration assistant that simplifies creation of enumerated variables in a programming language. For example, the enumeration assistant may be a component of an integrated development environment (IDE). The enumeration assistant may receive a name, a short description, a data type, and possible values of an enumerated variable from a programmer. The programmer enters the requested information and the enumeration assistant creates all development objects necessary to implement the enumerated variable in the programming language. For example, the development objects may include data elements and domains.

The programmer may also instruct the enumeration assistant to implement the enumeration variable in different ways. For example, an enumeration variable may be implemented as an interface, as a class or as a class with sub-class.

One example embodiment of the present invention may be a procedure for creating an enumerated variable. The procedure may include responsive to a request to create the enumerated variable received through a graphical user interface, determining parameters of the enumerated variable. The procedure may include creating development objects for the enumerated variable as a function of the parameters. The procedure may include storing the development objects in a program memory. The parameters may be received through the graphical user interface. The development objects may be created in a programming language environment and the program memory may be accessible to the programming language environment. The parameters may include a name, a text description, a data type and possible values of the enumerated variable. The development objects may include data elements and domains. The enumerated variable may be implemented as one of a class, a class with sub-classes and an interface. The procedure may further include searching the program memory for candidate enumerated variables. The procedure may further include displaying a list of candidate enumerated variables through the graphical user interface for selection. The procedure may further include responsive to displaying the list of candidate enumerated variables, receiving an indication of a selection of an enumerated variable through the graphical user interface, the enumerated variable selected from the list of candidate enumerated variables. The procedure may further include compiling the development objects into machine code. The procedure may further include interpreting and executing the development objects as a part of a computer application.

One example embodiment of the present invention may be a system for creating an enumerated variable. The system may include a program memory, an input device, an output device, and a processor. The processor may be adapted to execute an enumeration assistant. The enumeration assistant may be configured to, responsive to a request to create the enumerated variable via the input device through the graphical user interface, determine parameters of the enumerated variable. The enumeration assistant may be configured to create development objects as a function of the parameters. The enumeration assistant may be configured to store the development objects in the program memory. The program memory may be located in a server computer and the input device and the output device are located in a client computer. The parameters may be received via the input device through the graphical user interface. The processor may be further configured to execute a programming language environment application. The enumerated variable may be implemented as one of a class, a class with sub-classes and an interface. The parameters may include a name, a text description, a data type, and possible values of the enumerated variable. The enumeration assistant may be further adapted to search for candidate enumerated variables in the program memory, display a list of candidate enumerated variables via the output device through the graphical user interface, and responsive to the display of the list of candidate enumerated variables, receiving an indication of a selection of an enumerated variable via the input device through the graphical user interface, the enumerated variable selected from the list of candidate enumerated variables.

One example embodiment of the present invention may be a computer readable medium including instructions adapted to execute a procedure for creating an enumerated variable. The procedure may include, responsive to a request to create the enumerated variable received through a graphical user interface, determining parameters of the enumerated variable, creating development objects for the enumerated variable as a function of the parameters, and storing the development objects in a program memory. The parameters may be received through the graphical user interface. The procedure may further include searching the program memory for candidate enumerated variables, displaying a list of candidate enumerated variables through the graphical user interface for selection, and responsive to displaying the list of candidate enumerated variables, receiving an indication of a selection of an enumerated variable through the graphical user interface, the enumerated variable selected from the list of candidate enumerated variables.

Figure 1:
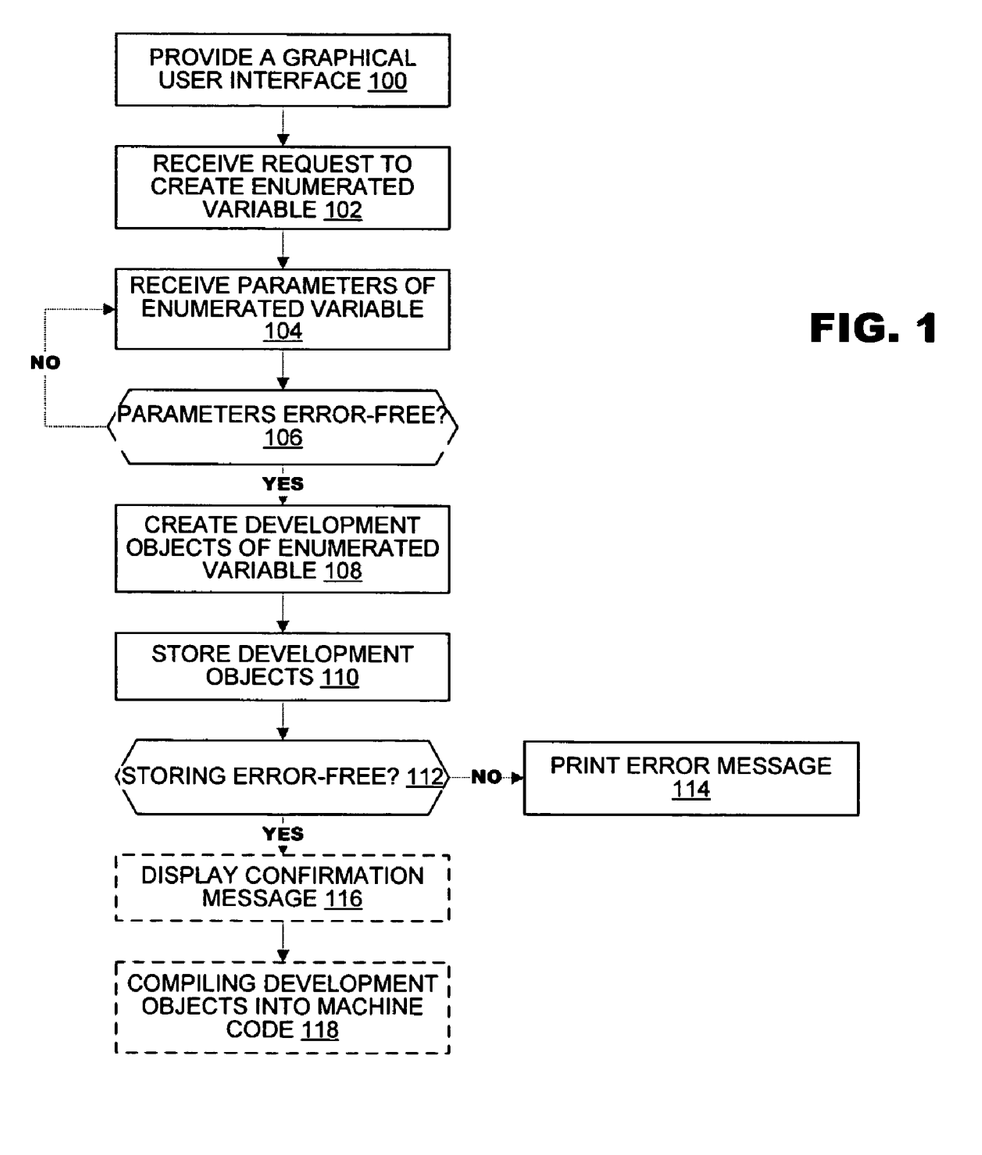
FIG. 1 illustrates a procedure for creating an enumerated variable according to an embodiment of the present invention.
Figure 4:
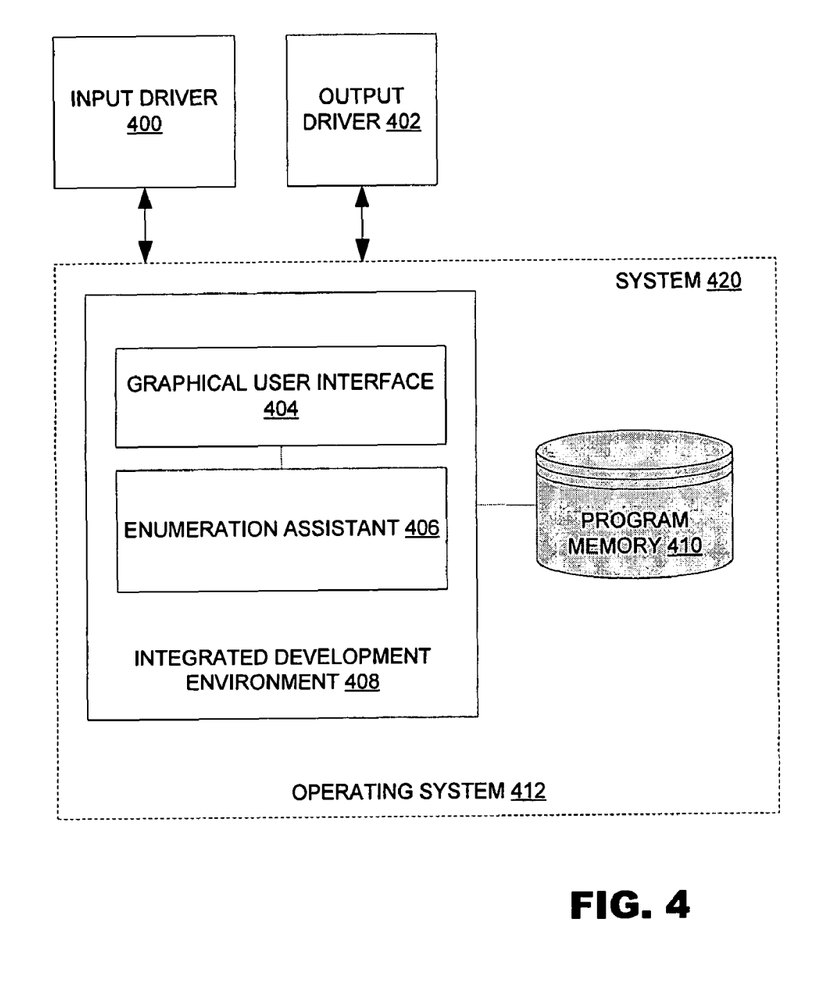
FIG. 4 illustrates a system which may execute the procedures according to an embodiment of the present invention.
Figure 7:
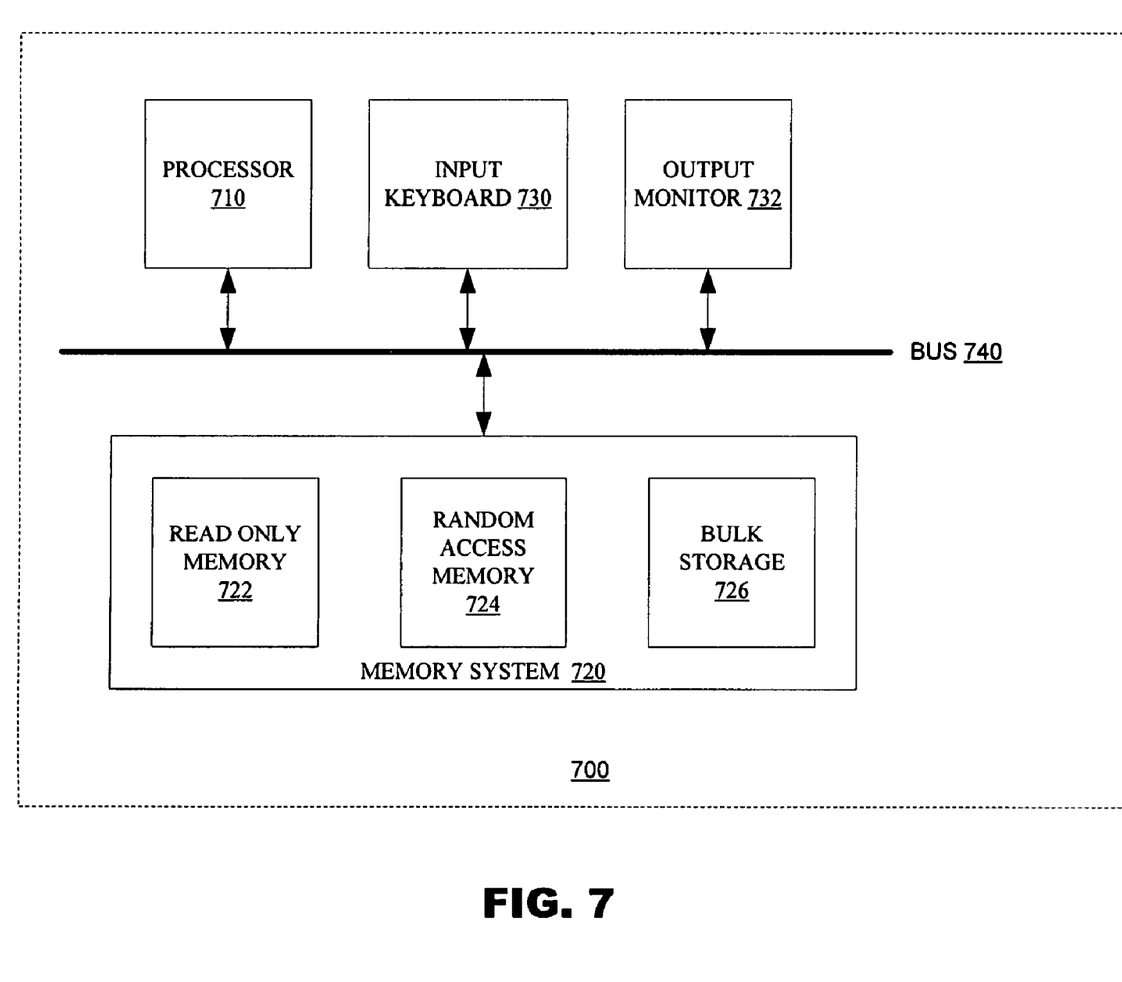
FIG. 7 illustrates a system which may execute the procedures according to an embodiment of the present invention.

FIG. 1 illustrates a procedure for creating an enumerated variable according to an embodiment of the present invention. The procedure may be executed on a computer system, for example, as depicted in FIGS. 4 and 7. The procedure may be implemented as an enumeration assistant. For example, the enumeration assistant may be a software wizard or tool integrated into an IDE used by a programmer in a programming language.

Figure 5:
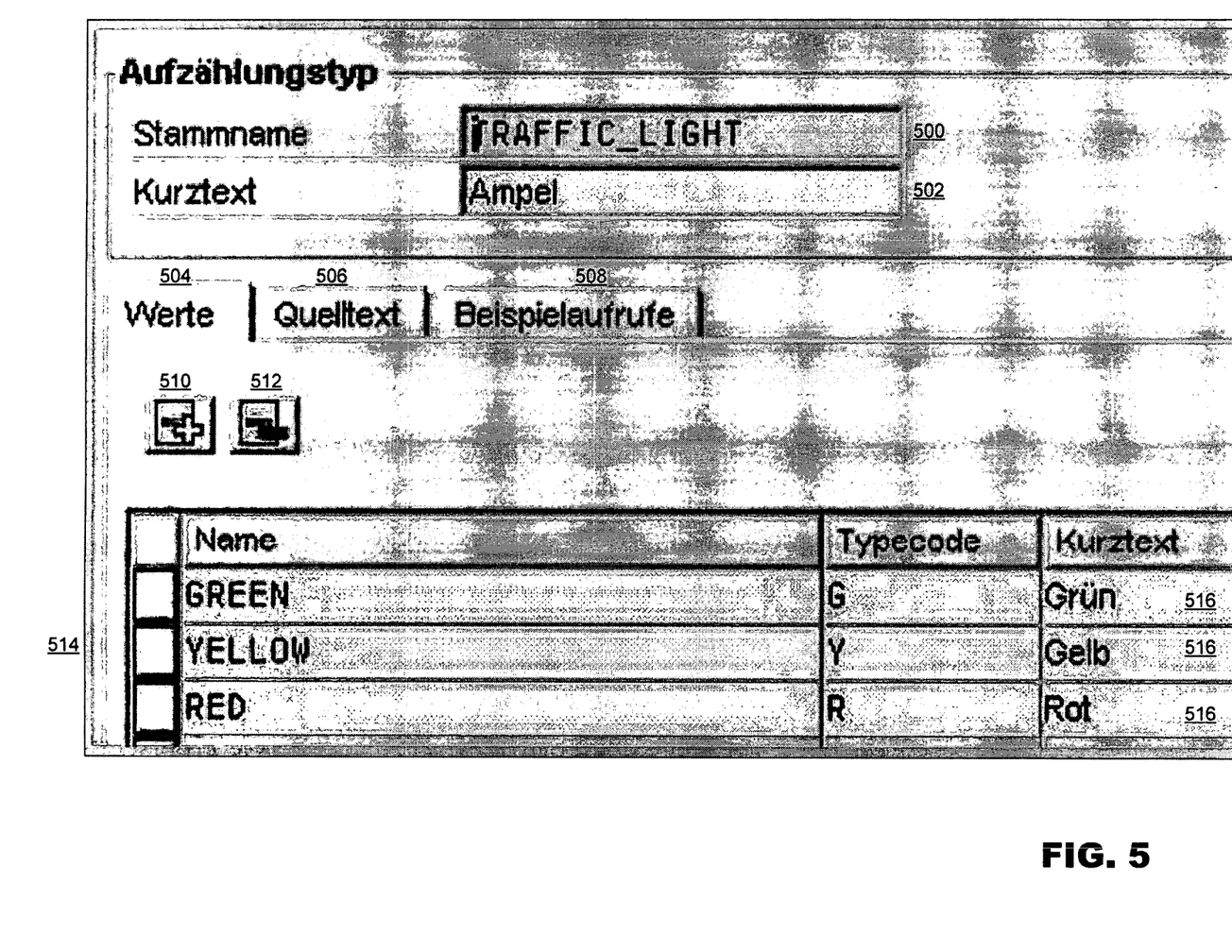
FIG. 5 illustrates a screen shot according to an embodiment of the present invention.
Figure 6:
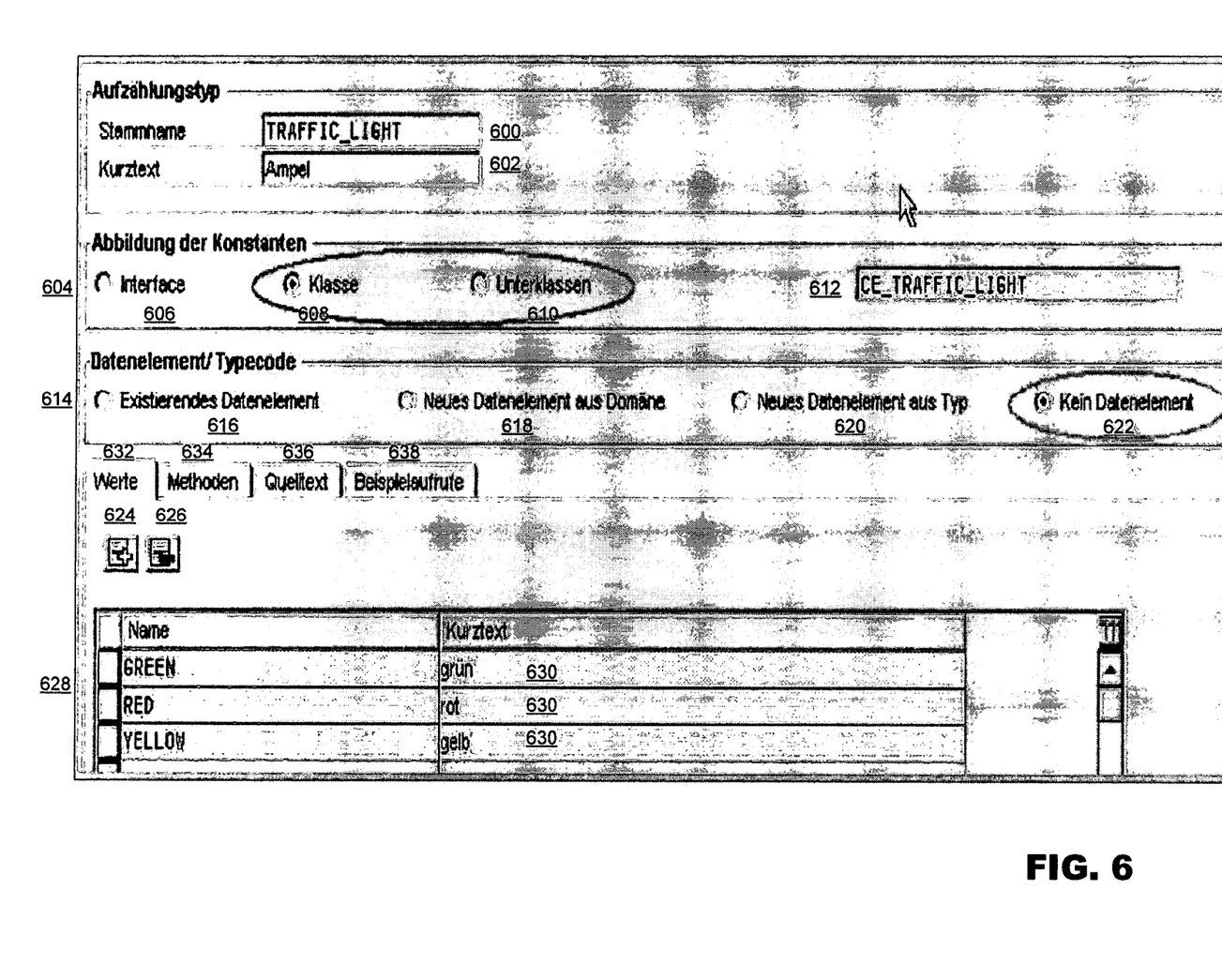
FIG. 6 illustrates a screen shot according to an embodiment of the present invention.

In 100, the procedure may provide a graphical user interface (GUI) implementing the enumeration assistant to the programmer on a display screen. The GUI may be configured to provide output to and receive input from the programmer. Exemplary GUIs are illustrated in FIGS. 5 and 6.

In 102, the procedure may receive a request to create an enumerated variable through the GUI from the programmer. The enumerated variable may be a new enumerated variable to be created in the system. For example, the GUI may include textboxes for a name, a text description and possible values of the enumerated variable. The GUI may also include a set of radio buttons for a data type of the enumerated variable. The GUI may also include areas where output such as confirmation messages to the programmer may be displayed.

In 104, the procedure may receive parameters for the new enumerated variable. The GUI may include a "Submit" button or similar method of input allowing the programmer to indicate he has completed 102 and has finished entering all the parameters.

In 106, the procedure may determine whether the parameters are error-free. For example, the parameters may be checked to be all of a correct type. In one embodiment, the name and text description values may be required to be text. In one embodiment, the procedure may check that each parameter has been entered and no parameter has a null or blank value. In one embodiment, the name of the new enumerated variable may be checked to not conflict with any other existing enumerated variable.

If there parameters are error-free, the procedure may proceed to 108. If the parameters are not error-free, the procedure may display an error message to the programmer and proceed to 104. In 104, the procedure may receive corrected parameters from the programmer.

In 108, the procedure may create development objects of the new enumerated variable. For example, development objects may be source code for interfaces or objects that implement the enumerated variable in the programming language. Alternatively, the development objects may include be data elements and data domains such as a new domain with typecodes, new data elements which refer to the domain and a typepool with symbolic names.

In 110, the procedure may store the development objects created in 108. The development objects may be stored in memory accessible by the IDE, such as RAM or hard disk.

In 112, the procedure may check whether the development objects were stored correctly in 110. If yes, the procedure may proceed to 116. If no, the procedure may proceed to 114.

In 114, the procedure may display an error message to the programmer indicating the development objects were not correctly stored in 110. The procedure may attempt to re-store the development objects or request an alternative storage destination from the programmer.

In 116, the procedure may optionally display a confirmation message to the programmer. Otherwise, the procedure may end. The confirmation may inform the programmer that the development objects were correctly stored.

In 118, the procedure may optionally compile the development objects from computer program form into machine code. The compiled machine code may be a portion of an application configured to execute on a compute processor. The compiled machine code may then be executed by itself by the computer processor.

Alternatively, the development objects may be left in a computer program form and parsed by an interpreter that executes it directly without compilation. A compiled machine code may executed faster on the computer processor, but interpreted development objects may be easier to debug and transfer to different processors.

The above procedure may allow the programmer to easily create the new enumerated variable by providing a graphical user interface and automating the creation of development objects of the new enumerated variable. The procedure automates the development object creation process and eliminates the need to enter redundant information into the programming language.

Figure 2:
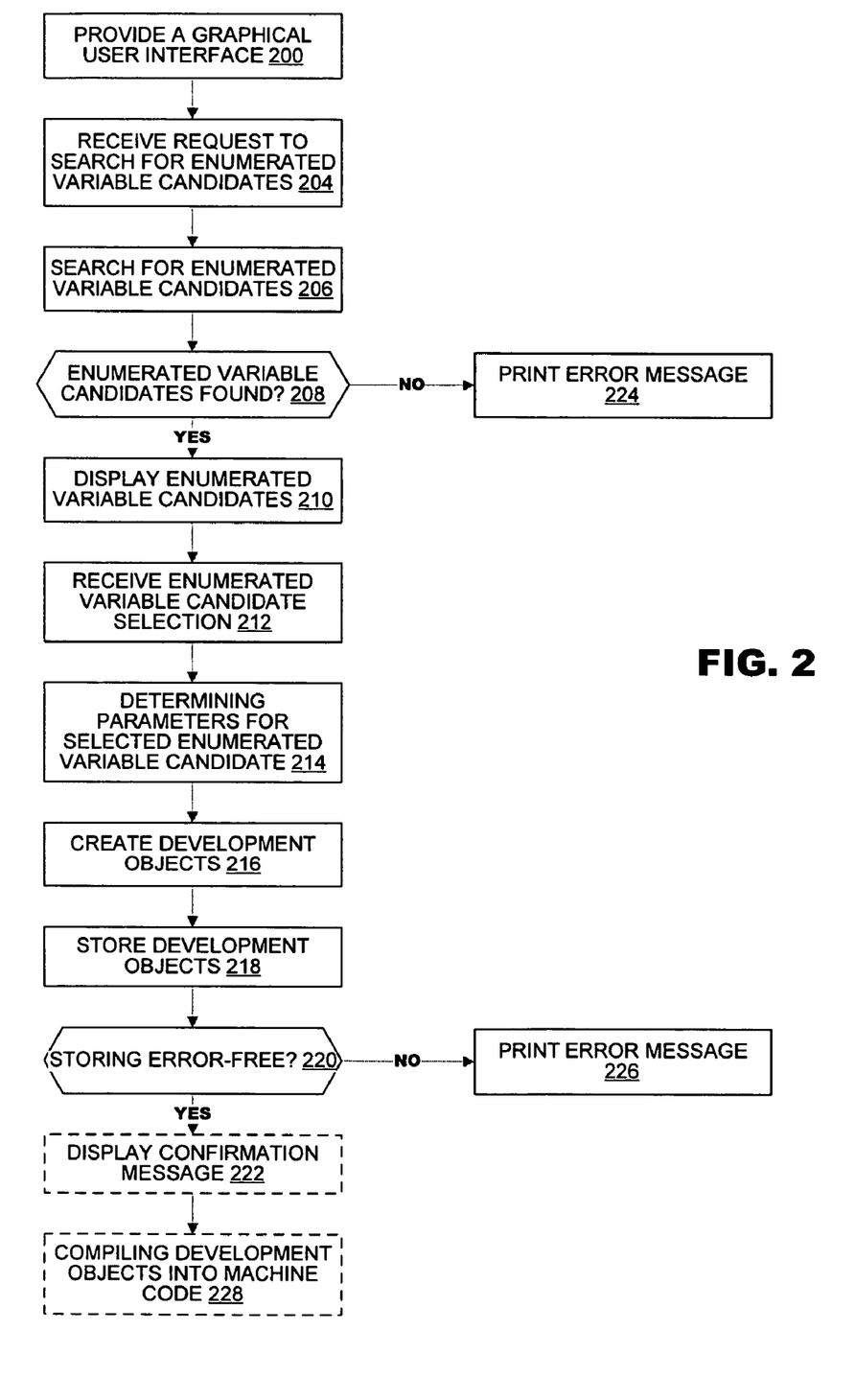
FIG. 2 illustrates a procedure for creating an enumerated variable according to an embodiment of the present invention.

FIG. 2 illustrates a procedure for creating an enumerated variable according to an embodiment of the present invention. The procedure may be executed on a system, for example, as depicted in FIGS. 4 and 7. The procedure may be implemented as an enumeration assistant. For example, the enumeration assistant may be a software wizard or tool integrated into an IDE used by a programmer in a programming language.

In 200, the procedure may display a graphical user interface (GUI) implementing the enumeration assistant. The GUI may be configured to provide information to and receive information from the programmer. The GUI may be, for example, as depicted in FIGS. 5 and 6.

In 204, a request to search for an enumerated variable may be received through the GUI from the programmer. The enumerated variable may be an enumerated variable already created in the system, but was not created by the enumeration assistant. For example, the GUI may include a button that begins the search.

In 206, the procedure may search for enumerated variable candidates. For example, the procedure may search through variables declared in the source code that are used with constant integer values. Such variables may be candidates for conversion to enumerated variables.

In 208, the procedure may test whether enumerated variable candidates were found. If enumerated variable candidates were found, the procedure proceeds to 210. If enumerated variable candidates were not found, the procedure proceeds to 224.

In 210, the procedure may display the enumerated variable candidates found in 206. The GUI may include an area where candidate enumeration variables are displayed for the programmer's selection. For example, the GUI may allow the programmer to select one or more candidate enumeration variables.

In 212, the procedure may receive an enumerated variable candidate selection. The selected enumerated variable candidate may be selected from the list displayed in 210. For example, the programmer may select one or more candidate enumeration variables to be converted by the enumeration assistant.

In 214, the procedure may determine parameters for the selected enumerated variable candidate. For example, the name of the enumerated variable may be set equal to the name of the variable to be converted. The possible values may be set equal to the integer constants declared for the variable to be converted. The programmer may be prompted for other parameters, such as descriptions of the enumerated variable and possible values. In addition, the procedure may utilize default values for parameters that have not been specified.

In 216, the procedure may create development objects of the new enumerated variable. For example, development objects may be source code for interfaces or objects that implement the enumerated variable in the programming language. Alternatively, the development objects may include be data elements and data domains such as a new domain with typecodes, new data elements which refer to the domain and a typepool with symbolic names.

In 218, the procedure may store the development objects created in 216. The development objects may be stored in memory accessible by the IDE, such as RAM or hard disk.

In 220, the procedure may check whether the development objects were stored correctly in 216. If yes, the procedure may proceed to 222. If no, the procedure may proceed to 226.

In 222, the procedure may optionally display a confirmation message to the programmer. Otherwise, the procedure may end.

In 224, the procedure may print an error message that no enumerated variable candidates were found. The procedure may end.

In 226, an error message may be displayed to the programmer indicating the development objects were not correctly stored in 220. The procedure may attempt to re-store the development objects or request an alternative storage destination from the programmer.

In 228, the procedure may optionally compile the development objects from computer program form into machine code. The compiled machine code may be a portion of an application configured to execute on a compute processor. The compiled machine code may then be executed by itself by the computer processor.

Alternatively, the development objects may be left in a computer program form and parsed by an interpreter that executes it directly without compilation. A compiled machine code may executed faster on the computer processor, but interpreted development objects may be easier to debug and transfer to different processors.

The above procedure may allow the programmer to easily convert enumerated variable candidates into the new enumerated variable by providing a graphical user interface and automating the creation of development objects of the new enumerated variable. The procedure automates the search and development object creation process and eliminates the need to enter redundant information into the programming language.

Figure 3:
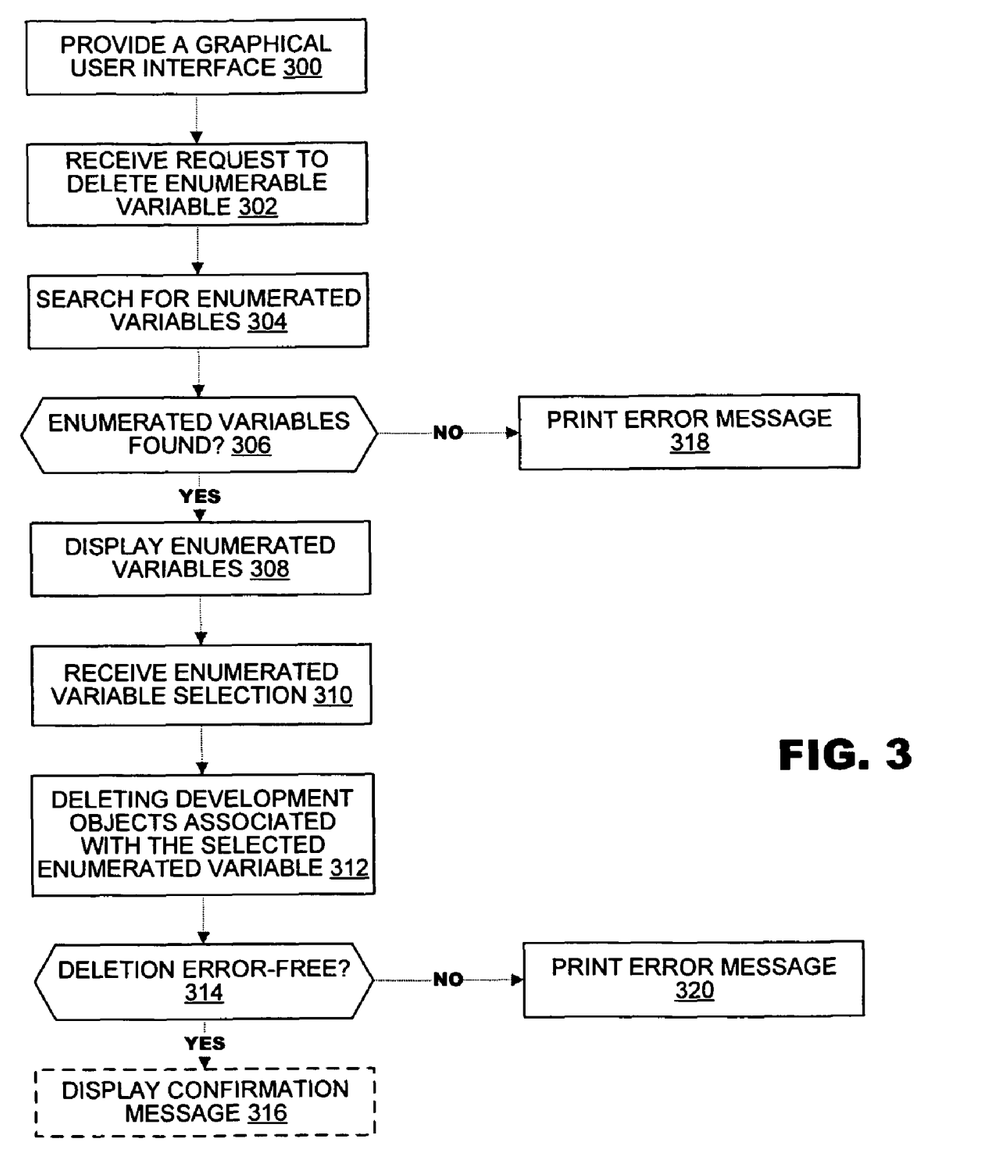
FIG. 3 illustrates a procedure for deleting an enumerated variable according to an embodiment of the present invention.

FIG. 3 illustrates a procedure for deleting an enumerated variable according to an embodiment of the present invention. The procedure may be executed on a computer system, for example, as depicted in FIGS. 4 and 7. The procedure may be implemented as an enumeration assistant. For example, the enumeration assistant may be a software wizard or tool integrated into an IDE used by a programmer in a programming language.

In 300, a graphical user interface (GUI) implementing the enumeration assistant may be provided. The GUI may be configured to provide information to and receive information from the programmer. The GUI may be, for example, as depicted in FIGS. 5 and 6.

In 302, the procedure may receive a request to delete an enumerated variable through the GUI from the programmer. The enumerated variable may be an enumerated variable already created in the system that is no longer needed.

In 304, the procedure may search for enumerated variables in the system. The procedure may search a list of enumerated variables previously created in the programming language by the enumeration assistant. Alternatively, the procedure may search through a source code for enumerated variables declared as interfaces, classes or subclasses. The GUI may include a button that begins the search.

In 306, the procedure may test whether enumerated variables were found in the system. If enumerated variables were found, the procedure proceeds to 308. If enumerated variables were not found, the procedure proceeds to 318.

In 308, the procedure may display the enumerated variables found in 308. The GUI may include an area where enumeration variables are displayed for the programmer's selection. For example, the GUI may allow the programmer to select one or more enumeration variables.

In 310, the procedure may receive an enumerated variable selection. The selected enumerated variable may be selected from the list displayed in 308. For example, the programmer may select one or more enumeration variables to be deleted by the enumeration assistant.

In 312, the procedure may delete development objects of the new enumerated variable. For example, development objects may be source code for interfaces or objects that implement the enumerated variable in the programming language. Alternatively, the development objects may be data elements and data domains. Alternatively, the development objects may include be data elements and data domains such as a new domain with typecodes, new data elements which refer to the domain and a typepool with symbolic names.

In 314, the procedure may check whether the development objects were deleted correctly in 312. If yes, the procedure may proceed to 316. If no, the procedure may proceed to 320.

In 316, the procedure may optionally display a confirmation message to the programmer. Otherwise, the procedure may end.

In 318, the procedure may print an error message that no enumerated variables were found. The procedure may end.

In 320, an error message may be displayed to the programmer indicating that development objects were not correctly deleted in 314. The procedure may attempt to re-delete the development objects or request additional information from the programmer.

FIG. 4 illustrates a system which may execute the procedures according to an embodiment of the present invention. A system 420 may be configured to execute the procedures depicted in FIGS. 1, 2 and 3. For example, the system 420 may be a server configured to communicate with a client over a network. Alternatively, the system 420 may be a personal computer or a portable computer. For example, the system 420 may be as depicted in FIG. 7.

Input driver 400 may interface between the system 420 and input devices. Input devices may be pointing devices, a touch-sensitive screen or a keyboard and receive input from a programmer.

Output driver 402 may interface between the system 420 and output devices. Output devices may be speakers, display screens and printers and provide output to a programmer.

Operating system 412 may execute on system 420. The operating system 412 interfaces between all components of the system. Example operating systems include UNIX, Windows and MacOS.

Integrated development environment (IDE) 408 may be configured to execute on the operating system 412. IDE 408 may be computer software that assists programmers develop software. For example, IDE 408 may include a source code editor, a compiler and interpreter, build-automation tools, and a debugger. A version control system and GUI construction tools may be available as well. A class browser, an object inspector and a class hierarchy diagram, for use with object oriented software development may be available as well. IDE 408 may be configured to support a particular programming language, such as C, C++ or Java.

Graphical user interface (GUI) 404 may be a system for interacting with a computer through manipulation of graphical images and widgets in addition to text. GUIs display visual elements such as icons, windows, menus, radio buttons, check boxes and icons, and employ a pointing device (such as a mouse, trackball or touch screen) in addition to a keyboard.

The GUI 404 may interface between the IDE 408 and the programmer by providing input and output methods over the input driver 400 and output driver 402.

Enumeration assistant 406 may be an interactive tool or wizard integrated into the IDE 408. Enumeration assistant 406 may interface with the programmer through the GUI 404. The enumeration assistant 406 may execute a procedure, for example, as depicted in FIGS. 1, 2 and 3.

Program memory 410 may be accessible by IDE 408. Program memory 410 may be physical memory such as RAM or hard drive where the IDE 408 and operating system 412 are stored and executed from.

FIG. 5 illustrates a screen shot according to an embodiment of the present invention. The screen shot may be of an enumeration assistant implementing procedures depicted in FIGS. 1, 2 and 3. The enumeration assistant may execute on a system, for example, as depicted in FIGS. 4 and 7. The enumeration assistant may be an interactive tool or wizard integrated in an IDE that receives parameters from a programmer for an enumerated variable to be created in an underlying programming language.

Variable name 500 may be a textbox that receives a variable name of the enumerated variable from the programmer. The enumeration assistant may restrict the variable name based on limitations of the programming language. For example, the variable name may be required to be a string of characters excluding spaces or a string of upper-case characters.

Variable description 502 may be a textbox that receives a description of the enumerated variable. The variable description 502 may be a standard text string. The enumeration assistant may restrict the length of the variable description 502.

Values tab 504 may allow the programmer to input possible values of the enumerated variable. When the values tab 504 is selected, the screen may be, for example, as depicted in FIG. 5 with variable values 514 and variable values entries 516.

Source code tab 506 may allow the programmer to view or edit a source code in the programming language of the enumerated variable as generated by the enumeration assistant. The source code may be displayed in a textbox for the programmer to review.

Sample tab 508 may display sample enumerated variables to the programmer. Example enumerated variables may serve as templates for the programmer to create new enumerated variables.

Add button 510 may allow the programmer to input a request to add a potential value to the enumerated variable. The add button 510 may add a variable values entry 516 to variable values 514.

Remove button 512 may allow the programmer to input a request to remove a potential value from the enumerated variable. The remove button 512 may remove a variable values entry 516 from variable values 514.

Variable values 514 may be a list of possible values that may be associated with the enumerated variable. Possible values may be added or removed with buttons 510 and 512.

The variable values 514 may be represented as a list, the list comprising at least one variable values entry 516. Each variable values entry 516 may be associated with data fields. For example, data fields may include a name or value, a type code and a description. Each data field may be edited by the programmer.

FIG. 6 illustrates a screen shot according to an embodiment of the present invention. The screen shot may be of an enumeration assistant implementing procedures depicted in FIGS. 1, 2 and 3. The enumeration assistant may execute on a system, for example, as depicted in FIGS. 4 and 7. The enumeration assistant may be an interactive tool or wizard integrated in an IDE that receives parameters from a programmer for an enumerated variable to be created in an underlying programming language.

Variable name 600 may be a textbox that receives a variable name of the enumerated variable from the programmer. The enumeration assistant may restrict the variable name based on limitations of the programming language. For example, the variable name may be required to be a string of characters excluding spaces or a string of upper-case characters.

Variable description 602 may be a textbox that receives a description of the enumerated variable. The variable description 602 may be a standard text string. The enumeration assistant may restrict the length of the variable description 602.

Variable implementation 604 may allow the programmer to select how the enumerated variable should be implemented in the programming language. Each programming language may have a variety of possible implementations for enumerated variables, such as an interface, a class, or a subclass.

Interface radio button 606 may instruct the enumeration assistant to implement the enumerated variable as an interface. Class radio button 608 may instruct the enumeration assistant to implement the enumerated variable as a class. Subclass radio button 610 may instruct the enumeration assistant to implement the enumerated variable as a class with subclasses.

An interface implementation may be created without any defined methods. A class implementation may enforce type safety when the enumeration variable is used in the programming language. The class implementation may be extended with the subclass implementation.

Implementation name 612 may be a name of the implemented enumerated variable. For example, the implementation name 612 may be a name of the interface implementing the enumerated variable in the programming language, if the enumerated variable is implemented as an interface.

Add button 624 may allow the programmer to input a request to add a potential value to the enumerated variable. The add button 624 may add a variable values entry 630 to variable values 628.

Remove button 626 may allow the programmer to input a request to remove a potential value from the enumerated variable. The remove button 626 may remove a variable values entry 630 from variable values 628.

Variable values 628 may be a list of possible values that may be associated with the enumerated variable. Possible values may be added or removed with buttons 624 and 626.

The variable values 628 may be represented as a list, the list comprising at least one variable values entry 630. Each variable values entry 630 may be associated with data fields. For example, data fields may include a name or value, a type code and a description. Each data field may be edited by the programmer.

Values tab 632 may allow the programmer to input possible values of the enumerated variable. When the values tab 632 is selected, the screen may be, for example, as depicted in FIG. 6 with variable values 628 and variable values entries 630.

Methods tab 634 may display methods implemented with the enumerated variable. The enumerated variable may be implemented as an interface, a class, or a sub class as selected in variable implementation 604, and will have methods associated with it.

Source code tab 636 may allow the programmer to view the underlying source code of the enumerated variable as generated by the enumeration assistant.

Sample tab 638 may allow the programmer to view a source code in the programming language of the enumerated variable as generated by the enumeration assistant. The source code may be displayed in a textbox for the programmer to review.

FIG. 7 illustrates a system which may execute the procedures according to an embodiment of the present invention. Functionality of the foregoing embodiments may be provided on various computer platforms executing program instructions. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method for creating an enumerated variable, comprising:
   searching variables declared in software code for constant values;
   displaying, on a graphical user interface, a list of variables having constant values as candidate enumerated variables for selection;
   responsive to a selection of one of the variables:
      setting a name of the enumerated variable to a name of the selected variable;
      setting a value of the enumerated variable to the constant value of the selected variable;
   prompting, through the graphical user interface, for descriptions and potential values;
   responsive to an indication that parameter entering has been completed, checking entered parameters to ensure correct data type;
   creating development objects for the enumerated variable as a function of the entered parameters, the development objects being source code for interfaces or software objects that implement the enumerated variable in a programming language; and
   storing the development objects in a program memory.

2. The method of claim 1, wherein the entered parameters are received through the graphical user interface.

3. The method of claim 1, wherein the development objects are created in a programming language environment and the program memory is accessible to the programming language environment.

4. The method of claim 1, wherein the entered parameters include a name, a text description, a data type and possible values of the enumerated variable.

5. The method of claim 1, wherein the development objects include data elements and domains.

6. The method of claim 1, wherein the enumerated variable is implemented as one of a class, a class with sub-classes and an interface.

7. The method of claim 1, further comprising:
   compiling the development objects into machine code.

8. The method of claim 1, further comprising:
   interpreting and executing the development objects as a part of a computer application.

9. A system for creating an enumerated variable, comprising:
   a program memory;
   an input device;
   an output device; and
   a processor executing an enumeration assistant, the enumeration assistant configured to,
      search variables declared in software code for constant values;
      display a list of variables having constant values as candidate enumerated variables through a graphical user interface on the output device for selection;
      responsive to a selection of one of the variables:
         set a name of the enumerated variable to a name of the selected variable;
         set a value of the enumerated variable to the constant value of the selected variable;
      prompt, through the graphical user interface, for descriptions and potential values;
      responsive to an indication that parameter entering has been completed, check entered parameters to ensure correct data type, create development objects as a function of the entered parameters, the development objects being source code for interfaces or software objects that implement the enumerated variable in a programming language, and store the development objects in the program memory.

10. The system of claim 9, wherein the program memory is located in a server computer and the input device and the output device are located in a client computer.

11. The system of claim 9, wherein the entered parameters are received via the input device through the graphical user interface.

12. The system of claim 9, wherein the processor is further configured to execute a programming language environment application.

13. The system of claim 9, wherein the enumerated variable is implemented as one of a class, a class with sub-classes and an interface.

14. The system of claim 9, wherein the entered parameters include a name, a text description, a data type, and possible values of the enumerated variable.

15. The system of claim 9, further comprising:

a compiler executed on the processor, the compiler configured to compile the development objects into machine code.

16. A computer readable storage medium including instructions adapted to execute a method for creating an enumerated variable, the method comprising:

searching variables declared in software code for constant values;

displaying a list of variables having constant values as candidate enumerated variables through a graphical user interface for selection;

responsive to a selection of one of the variables:
setting a name of the enumerated variable to a name of the selected variable;
setting a value of the enumerated variable to the constant value of the selected variable;

prompting, through the graphical user interface, for descriptions and potential values;

responsive to an indication that parameter entering has been completed, checking entered parameters to ensure correct data type;

creating development objects for the enumerated variable as a function of the entered parameters, the development objects being source code for interfaces or software objects that implement the enumerated variable in a programming language; and storing the development objects in a program memory.

17. The computer readable storage medium of claim 16, wherein the entered parameters are received through the graphical user interface.

18. The computer readable storage medium of claim 16, wherein the development objects are created in a programming language environment and the program memory is accessible to the programming language environment.

19. The computer readable storage medium of claim 16, wherein the entered parameters include a name, a text description, a data type and possible values of the enumerated variable.

20. The computer readable storage medium of claim 16, wherein the enumerated variable is implemented as one of a class, a class with sub-classes and an interface.

* * * * *